United States Patent [19]

Carter

[11] 3,936,909
[45] Feb. 10, 1976

[54] APPARATUS FOR SEVERING THIN TUBING MEMBERS

[75] Inventor: Clarence F. Carter, Danville, Ill.

[73] Assignee: Carter Engineering Company, Danville, Ill.

[22] Filed: Jan. 23, 1974

[21] Appl. No.: 435,772

[52] U.S. Cl. .................................................. 17/42
[51] Int. Cl.² ........................................... A22C 11/02
[58] Field of Search .............. 83/171, 16, 53; 225/2, 225/93.5, 94, 96, 96.5; 17/42

[56] References Cited
UNITED STATES PATENTS

| | | | |
|---|---|---|---|
| 2,106,274 | 1/1938 | Frayer et al. | 225/94 |
| 3,110,058 | 11/1963 | Morbach | 17/42 |
| 3,600,994 | 8/1971 | Zapater | 83/171 X |

Primary Examiner—Harrison L. Hinson
Assistant Examiner—Leon Gilden
Attorney, Agent, or Firm—Burns, Doane, Swecker & Mathis

[57] ABSTRACT

A method and apparatus for severing a length of shirred casing from a length of unshirred casing utilizes a mandrel onto which an unshirred casing is introduced. A fluid is injected between the casing and the mandrel. The casing is shirred into tight overlays to provide a length of shirred casing. This length of shirred casing and the yet unshirred casing are engaged to displace them relative to and sever them from each other. Prior to severence, the casing is circumferentially weakened by thermal partial decomposition of the casing or by at least partial penetration with a weakening tool that does not engage the mandrel.

32 Claims, 8 Drawing Figures

APPARATUS FOR SEVERING THIN TUBING MEMBERS

BACKGROUND OF THE INVENTION

This invention relates generally to an apparatus for severing thin tubing members or casings such as are used to contain prepared meats in the manufacture of sausages and other products. More specifically, the invention relates to an apparatus for severing shirred from unshirred portions of a casing.

Previously, sausage and other similar meat products were made by injecting certain prepared meats into lengths of the intestines of various animals. More recently, artificial cellulosic materials have been substituted for the natural intestine casing. Such artificial casings may be produced in virtually endless lengths. Extremely long lengths, however, may be difficult to handle in the manufacturing of sausage and other similar products. Thus, the thin, artificial casing material is compressed into relatively short axial lengths by shirring, i.e., laying the casing into tight axial folds or overlays. The casing material may thereby be reduced to convenient lengths called "sticks." The shirred sticks may be subsequently injected with prepared meat under sufficient pressure to unshir the stick and fill the previously shirred casing.

Though various methods are employed in the processing of casing into shirred lengths as described above, a conventional method involves the use of a storage roll from which casing material is drawn over a feeding roller and between driving belts. The driving belts grip the casing against the resistance of air pressure introduced into the interior of the casing by an apertured, inflating mandrel around and along which the casing moves. The driving belts direct the casing into a plurality of shirring rollers which shirr or lay the casing in tight folds or overlays to provide a highly compacted, shirred length of material.

Since it is desired commercially that the shirred casing material be cleanly cut, a cutter must be provided. It is in this regard that the present invention is useful in cleanly and quickly severing the shirred casing from the unshirred portion. With regard to this and other applications, the devices of the prior art entail a number of problems, such as those discussed below, which have not been dealt with or which have not been dealt with effectively.

Many of the devices for cutting casings which appear in the prior art may fail to cleanly cut the casing. An ineffective cut may produce loose flags, strands, or tatters in the area in which the casing materials are cut. Such loose flags, strands, or tatters may become embedded in the prepared meats which fill the casings and may be unpleasant to persons consuming the finished product. Such loose flags also may interfere with the forming of a finished sausage into lengths and may hamper the formation of an adequate seal at the end of the sausage.

Of independent significance, the loose flags, strands, or tatters which may result from ineffective cutting of the casing may also hamper satisfactory securement of the prepared casing to the machine which fills the casing with prepared meats. Moreover, these loose flags, strands, or tatters may render the casing more vulnerable to splitting or tearing in the area adjacent thereto.

Those devices of the prior art may be subject to other problems, as well as those of loose flags, strands, or tatters, which may occur at the severed section. These devices may be subject to a further difficulty of residual stresses and distortions introduced into the end of the casing adjacent the point at which the casing was severed by tearing or other such severing operations. Such residual stresses and distortions may render the end of the casing more susceptible to tearing and rupture and may impart irregular shape to the casing. A rupture, of course, may be wasteful of meat and casing. It would thus be desirable if an apparatus could be provided for cutting casings for prepared meats which would avoid residual stresses and distortions in the casings.

Other devices of the prior art which are employed to cut casings for meat may introduce stresses of unacceptable magnitude into the mandrel around and along which the casing is passed. A mandrel which is employed to support and inflate the casing may be rather long and slender and may be supported at only one end. Being loaded with a length of casing, a mandrel of the type just described may be particularly vulnerable to overstressing, fatigue, and fracture, particularly if forces applied to the mandrel are not balanced, or if they are cyclical in application. Fracture of a mandrel as a result of overstressing or fatigue may result in leakage of the inflating medium and may require costly repair during which the machine for preparing the casings may be idle. It would thus be desirable if an apparatus could be provided for cutting the casing for meat which would apply only balanced forces to the mandrel or which would apply no forces whatever to the mandrel.

The shirring of the casing may be conducted at high speeds. In this regard, many of the devices for cutting cashings which appear in the prior art may not function at a sufficiently high speed to provide economical production of the shirred casing materials. These devices may involve a relatively large number of parts which interact in a relatively complicated sequence of operation. Such arrangements may not only slow production but also may be vulnerable to wear and mechanical failure. In addition, such arrangements may require frequent lubrication which may contaminate the casing. Thus, it would be desirable if an apparatus for cutting casings for meats could be provided which could operate at a higher and more economical speed compatible with that of the shirring operation and yet remain simple in construction and relatively maintenance free.

Moreover, devices of the prior art subject to one or more of the problems discussed above may introduce unnecessary costs to the preparation of shirred casing. To the extent loose flags, strands, or tatters product a less acceptable finished product or hamper proper injection of meat into the casing, the cost of the finished sausage or other product may be increased. Similarly, shirred casing unnecessarily weakened may waste both casing and meat and may thus increase costs. Also, a mandrel which fails due to overstressing or fatigue, and which must be replaced also may increase costs of preparing shirred casings as may slow, uneconomical production and the maintenance requirements associated with a complex structure.

A U.S. Pat. No. 3,112,517, issued to Clifford E. Ives is illustrative of certain of the problems discussed above. This patent discloses a device for cutting casing wherein a digger or catch finger lifts and radially engages and penetrates the folds of the shirred casing. Opposed pinch rollers next advance in the direction in which the casing is shirred to unshirr a portion of the casing. Once the pinch rollers pass the catch finger and unshirr a length of casing, a scoring yoke or cutter moves radially to score and tightly clamp the casing against the support mandrel at points of contact on opposite sides of the mandrel. The continued movement of the pinch rollers tears the casing into opposed lengths, leaving triangular flaps, which are referred to as fishtails. The pinch rollers complete the operation by reshirring the unshirred casing.

A particular problem which would seem to occur with the Ives device is that the manner in which the casing is severed may cause undesirable loose flags, strands, or tatters and the associated problems mentioned earlier. It will be recalled from the preceding that the casing is scored and clamped against the mandrel on opposite sides thereof. The casing is subsequently torn into opposed lengths. It would seem apparent that this clamping and tearing may leave undesirable loose flags, strands, or tatters at the point at which the casing is severed.

Furthermore, it appears that the method of cutting casings disclosed by the Ives patent may apply considerable unbalanced force to the long, slender mandrel and thus, may overstress or fatigue the mandrel. It will be noted that considerable unbalanced force may be exerted on the mandrel by the catch finger during penetration between the folds of the shirred casing. Similarly, considerable unbalanced force may be exerted on the mandrel by the scoring yoke which must engage and clamp the casing against the mandrel with sufficient force to score and tightly secure the unshirred casing. It would thus appear that the individual or combined effects of these forces may overstress, fatigue, and eventually fracture the long, slender mandrel.

Finally, it would appear that the Ives device may entail a relatively large number of components which interact in a relatively complex manner. The number of parts would appear to introduce related problems of increased maintenance and lubrication requirements.

A U.S. Pat. No. 3,110,058, issued to Walter V. Marbach discloses a device which may involve many of the problems discussed earlier. The device disclosed in the Marbach patent provides a rotating gripping member on which are disposed pivoting jaws which grip and clamp an unshirred portion of the casing against the mandrel. When the gripping member has been rotated into position and the casing clamped against the mandrel, movement of the gripping member parallel to the longitudinal axis of the mandrel severs the casing at the leading edge of the gripping member by simple overstressing against the resistance of the shirring wheels.

Not only may this device be subject to the problem of loose flags, strands, or tatters which may develop incident to incomplete circumferential gripping of the casing, but also residual stresses and distrotions may be introduced in the portion of the casings adjacent the severed section. Such residual stresses and distortions may cause undesirable weakness and irregularity in shape in the end of the casing as mentioned earlier. Severing the casing by simple overstressing may also not effect the separation at the desired section of the casing. In other words, since an overstressed casing will break at the weakest point along the overstressed length, simple overstressing of the casing may not sever the casing at the desired point.

OBJECTS AND SUMMARY OF THE PREFERRED FORMS OF THE INVENTION

It is therefore a general object of the invention to provide a novel apparatus for cutting casings for meat intended to solve or minimize the problems of the type previously noted.

It is a particular object of the invention to provide a novel apparatus for cutting casings for meats wherein the casing is cut between the shirred and the unshirred portions of the casing in a clean and complete fashion free of loose flags, strands, or tatters at the severed edge.

It is another object of the invention to provide a novel apparatus for severing casings for meats which, while cleanly and effectively severing the casing, maintains the casing free of residual stresses and distortions in the zone of severing.

It is yet another object of the invention to provide a novel apparatus for severing casings for meats wherein the mandrel supporting the casing is maintained in a relatively stress free condition and is not acted upon by unbalanced forces exerted incident to the severing operation.

It is a further object of the invention to provide a novel apparatus for severing casings for meats wherein the severing of the casing is effected essentially at the interface of the shirred and the unshirred portions at a speed compatible with the high speed of the associated shirring operation.

It is still a further object of the invention to provide a novel apparatus for severing casings for meats which, by reason of the simplicity of its structure and operation, is less costly to operate and maintain.

An apparatus for severing casings according to a preferred embodiment of the invention intended to accomplish at least some of the foregoing objects, functions in cooperation with a shirring apparatus which processes unshirred casing into shirred casing.

Such a shirring apparatus may take a number of forms, but is generally comprised of a storage roll upon which a virtually endless length of casing is stored. The casing is directed from the storage roll through opposed feeding rollers in a desired direction. The casing is subsequently advanced around and along a hollow, apertured mandrel through which a pressurized inflating medium, such as compressed air, is introduced into the interior of the casing.

Opposed driving belts grip the inflated casing and continue the advancement of the casing along the mandrel. The driving belts further advance the casing into shirring rollers. The shirring rollers may be disposed at equal 120° intervals about the mandrel. The shirring rollers are positioned in sufficient proximity to the mandrel to frictionally grip the unshirred casing and shirr it against the resistance of a slowly and uniformly retreating backup block.

In the preferred embodiment this backup block is rigidly secured to the mandrel. Thus, both the mandrel and the backup block retreat as a unit as shirred casing accumulates on the mandrel. Once the shirring rollers shirr a desired length of casing and only the tip of the mandrel remains between the shirring rollers, means are actuated to stop the shirring mechanism while the mandrel continues its retreating movement. This continued movement of the mandrel tends to draw or pull a short length of unshirred casing immediately downstream from the now stopped shirring rollers in a direction towards the length of already shirred casing. After this short length of unshirred casing is advanced to a desired position, the novel apparatus for cutting the casing, according to the present invention, comes into operation.

The novel apparatus for cutting the casing employs penetrating means to at least partially penetrate substantially an entire circumference of the casing between the shirred and the unshirred portions thereof. Concurrently the shirred and unshirred portions are firmly engaged by first and second engaging means. Finally, a displacing means displaces the first engaging means relative to the second engaging means to thereby sever the shirred from the unshirred casing.

In a preferred form, the apparatus severs the shirred casing from the unshirred casing at a location essentially defining the interface of the shirred and the unshirred portions of the casing material. The severing is accomplished by the composite motion of the severing apparatus wherein a separating means, comprised of engaging means of suitable form for engaging the casing, first secures the adjacent shirred and unshirred portions of casing. Concurrently, said penetrating means, hereinafter more fully described, pivot in a radial plane to a position of normal contact with the casing and at least partially penetrate substantially the full circumference of the casing essentially at the interface of the shirred and the unshirred portions without contacting the mandrel which carries the shirred casing. The shirred portion of the casing is next displaced relative to the held in place unshirred portion to effect a separation of the shirred from the unshirred portions at the section at which the circumferential penetration has taken place.

Of independent significance, the penetrating means at least partially penetrates the casing but without contacting the mandrel around which the casing is carried. The inflating medium, e.g., compressed air, is continuously introduced against an inside of the casing to provide a "fluid cushion." It is against the force of this fluid cushion that the penetrating means presses the outside of the casing to effect the at least partial penetration of the casing.

The separation means is preferably comprised of first engaging means for engaging the shirred casing and second engaging means for engaging the unshirred casing. The first engaging means may be moved into position for this purpose by a cam arrangement or other means, a preferred form of which is hereinafter more fully described. In a preferred embodiment, the first engaging means may be comprised of first clamping means in the form of arcuate clamping surfaces and essentially planar abutting surface means. The first engaging means engages the shirred portion of the casing at a location immediately adjacent the unshirred casing. The second engaging means may be comprised of feeding means such as the feeding roller mentioned earlier or other suitable second clamping means which secure the unshirred portion of the casing against axial movement after the shirring mechanism is momentarily stopped and a short length of unshirred casing is exposed beyond the shirring rollers.

In a preferred form, a displacing means imparts motion directionly to a proximal end or shoulder of the shirred casing. An element of the displacing means which, in a preferred embodiment, may be comprised of a pivot arm and a rotating cam which acts upon the end of the pivot arm, moves the displacing means into contact with the shoulder of the shirred casing for the purpose of imparting the motion mentioned above parallel to the longitudinal axis of the mandrel.

The first engaging means, the displacing means, and the penetrating means may all function independently, though sequentially. However, greater simplicity, dependability, and freedom from problems of maintenance may be attained if the elements mentioned are essentially integral. To this end, the elements in a preferred embodiment are connected and made integral by a suitable connecting means in the form of a solid head. Thus, in a preferred embodiment, when the first engaging means is moved into contact with the shirred casing to secure it in preparation for separation, the penetrating means is properly positioned to contact and at least partially penetrate the unshirred casing essentially at the interface of the shirred and the unshirred portions.

For the purposes of proper positioning, the penetrating means is disposed on each head immediately adjacent the abutting surface. As noted above, the penetrating means is operable to at least partially penetrate an unshirred portion of the casing at essentially the interface of the shirred and the unshirred casing. In a preferred embodiment the penetrating means is comprised of arcuate lengths of wire heated to a temperature sufficient to at least partially decompose and thereby penetrate the unshirred casing. In the alternative, the penetrating means may be comprised of arcuate blades for at least partially penetrating the thickness of the casing.

As noted above, a head unifies the first engaging means, the displacing means, and the penetrating means. Desirably, the apparatus of the present invention is comprised of three such heads, disposed 120° apart. The heads cooperate to perform the severing operation by simultaneously moving, by means of the first displacing means, to circumferentially clamp and axially abut a shoulder portion of the shirred casing immediately adjacent the unshirred portion while concurrently at least partially penetrating substantially the full circumference of the adjacent unshirred portion without contacting the mandrel carrying the casing. The displacing means separates the shirred from the unshirred portion by axial displacement of the shirred portion relative to the unshirred portion, the unshirred portion being restrained by the second engaging means. By virtue of the dimensions of the arcuate configuration of the heads, the casing may be engaged and penetrated equally by each head. Furthermore, the heads acting together may penetrate and clamp substantially the full circumference of the casing in such a manner as to provide essentially uniform forces of penetration and separation so that the casing may be cleanly and effectively severed without imposing detrimental forces on the mandrel. The clamping and abutting surfaces and the penetrating means of each head circumferentially engage substantially the full circumference of the casing in a balanced, uniform manner by virtue of a symmetric disposition of the pivot arms about the mandrel and casing and the essentially radial movement of each head into contact with the casing in response to forces exerted by the first displacing means.

The heads and associated clamping and abutting surfaces and penetrating means are disposed on the ends of slender pivot arms which are pivotably disposed about the mandrel and casing on a base through which the mandrel and unshirred casing pass.

Coaxially with the opening of the base and on a side of the base opposite the heads there is a rotatable cam. The rotatable cam engages each of the arms at an end opposite the head and serves to move this portion of each of the arms radially to pivot the arms and thus radially move the heads and associated clamping and abutting surfaces and the penetrating means simultaneously into and out of engagement with the casing upon rotation of the cam. The rotating cam and the pivot arms form the first displacing means.

It will be appreciated that an appratus, which severs thin tubing as described above, may have several specific applications. For instance, such an apparatus might be employed to sever thin tubing fabricated from cellulose or other similar membranous materials. Such an apparatus might also be employed to sever certain types of flexible plastic pipe or garden hose in the course of manufacturing such items. As indicated, however, a particularly useful application of such an apparatus is found in severing unshirred from shirred portions of casing being prepared for use in the manufacture of various types of sausage and other prepared meats.

THE DRAWINGS

Other objects and advantages of the present invention will become apparent with reference to the detailed description to follow of a preferred embodiment thereof wherein like reference numerals have been applied to like elements in which.

DETAILED DESCRIPTION

Figure 1:
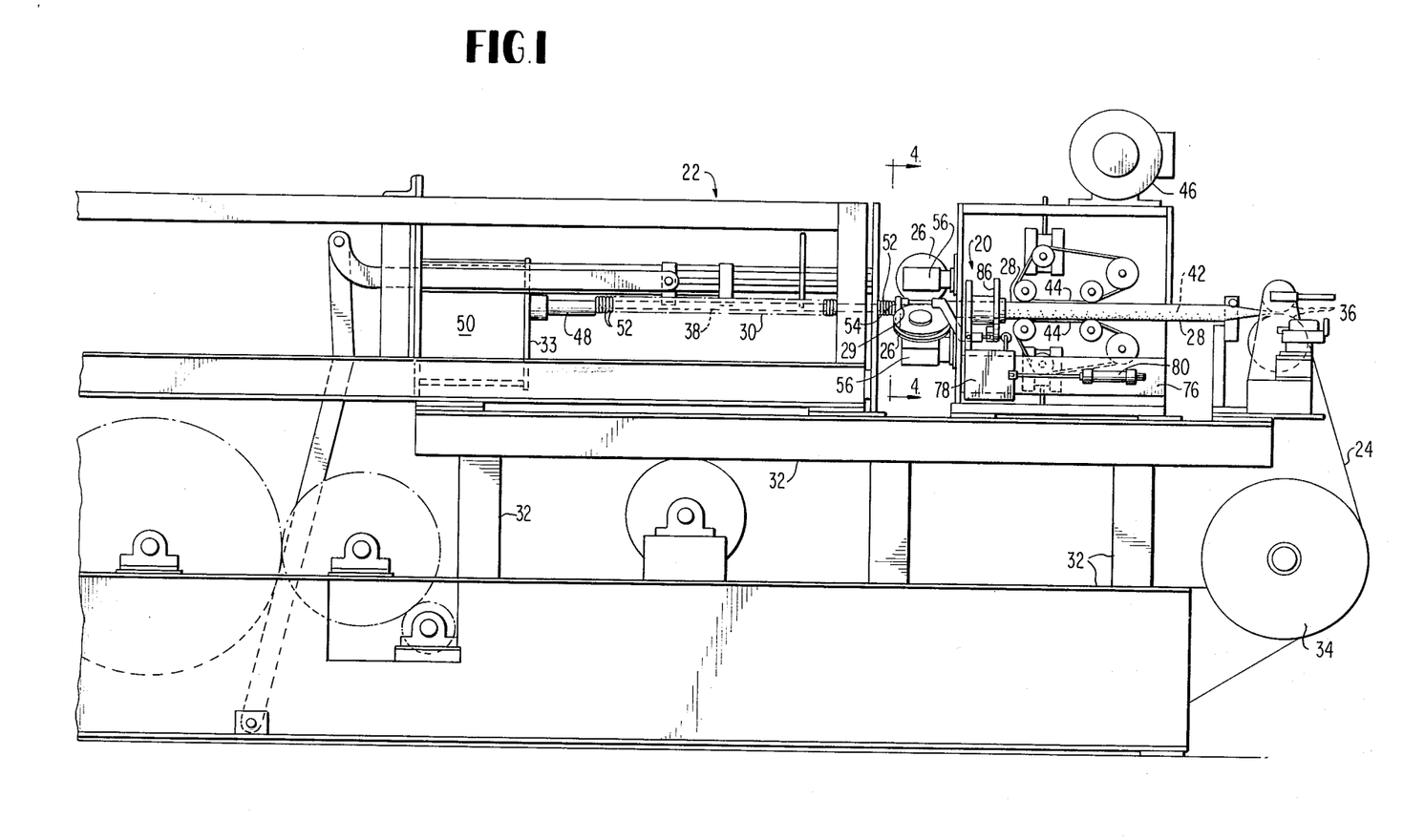
FIG. 1 is a front view of an apparatus for shirring casing showing the general position of an embodiment of the apparatus for severing casing relative to other fixtures of the shirring apparatus.

Referring to FIG. 1 of the drawings, a preferred embodiment of the invention can be seen generally at 20 relative to other fixtures of an apparatus 22 for preparing lengths of shirred casing from a supply of unshirred casing. The apparatus for shirring the casing is supported by a frame 32 on which is rotationally disposed a storage means or roll 34 upon which is wound a length of casing 24 for processing by the shirring machine 22. The casing 24 is directed from the storage means or roll 34 to opposed feeding means or rollers 36 which firmly grip and direct the casing from the vertically oblique direction to a horizontal direction. From the feeding rollers 36 the casing is directed around and along a hollow, apertured guiding means or mandrel 38 having an orifice 40 in the end thereof through which a pressurized inflating medium, such as air, enters the interior 42 of the as yet unshirred casing 28 (see FIGS. 4 and 5). The pressurized medium may be produced by any suitable compressing or inflating means such as an air pump 50. Opposed driving means or belts 44 driven by a motor 46 contact and frictionally engage the inflated, unshirred casing 28 and direct the casing into shirring means or rollers 26. The shirring rollers 26 frictionally engage the unshirred casing 28 and convert this unshirred casing to shirred casing 30 by folding the casing in tight folds or overlays known as shirrs 52 against the resistance of a back stop 48 which is connected to and slowly retreats with the mandrel 38. The shirring rollers are circumferentially disposed around the casing (see FIG. 4) and grip and shirr the casing by means of arcuate peripheral surfaces 64.

As may be seen in FIG. 1, the novel apparatus for severng the casing 24 into uniform, prescribed lengths is located generally at 20. As will be discussed in greater detail below, the apparatus for severing the casing may be disposed in a generally circumferential manner about the casing between and adjacent the shirring rollers 26.

In operation, the unshirred casing 28 is advanced in a vertically oblique direction from a storage 34 over selectively operable feeding means or rollers 36 into a horizontal direction. Upon being inflated by a pressurized medium conducted through the mandrel 38 from the inflating means 50, the casing 28 is advanced along the mandrel 38 by opposed driving belts 44 into engagement with shirring rollers 28 disposed in a generally circumferential manner about the mandrel 38 and the unshirred casing 28. The shirring rollers 26 lay the unshirred casing 28 in tight folds or shirrs 52 against the resistance of a backup block 48 which retreats with the mandrel 38. When a desired length of shirred casing 30 has been formed, the shirring rollers 26 stop. The mandrel 38 continues to withdraw a short distance in the direction of the shirred casing 30 and draws a shirt length of unshirred casing 28 into a position beyond the shirring rollers 26.

Though a number of techniques may be employed to manipulate the mandrel and backup block assembly as described in the preceding, it is preferred that the mandrel be cantilevered from a horizontally rotatable, retreating turret 33. A plurality of such mandrels and backup blocks can be mounted on the turret; however, for simplicity, only one such mandrel is shown.

At the beginning of the shirring cycle just described, an empty mandrel is fully inserted between the shirring rollers (see FIG. 4) and within the as yet unshirred casing until the tip of the mandrel approaches the feed rollers 36. As casing is shirred on the mandrel against the backup block rigidly connected thereto, the turret 33 and thus the mandrel and backup block retreat in the direction of the accumulating shirred casing away from the shirring roller 26. Ultimately, when a desired length of casing has been shirred on the mandrel, the mandrel remains inserted only a short distance between the shirring rollers (see FIG. 5). At this point the shirring mechanism stops. The mandrel 38 and backup block, however, continue to retreat and a short length of unshirred casing is drawn into a position beyond the shirring rollers.

Inasmuch as the already shirred casing is advanced by the mandrel after the shirring rollers have been stopped, there will be a tendency for the shirred casing to axially expand slightly with a result that the actual length of the "stick" of shirred casing may appear to continue to increase even though the shirring rollers have stopped. As will be discussed below, the exposed length of unshirred casing and the axial freedom of the shirred casing facilitate the severing of the shirred from the unshirred casing.

Once the mandrel is full and the casing cut, the mandrel continues to retreat until it is fully withdrawn from between the shirring rollers. Once the loaded mandrel reaches the fully retreated position, the turret 33 rotates about a horizontal axis generally parallel to the axis of the old mandrel to position a new mandrel in place of the old one. The new mandrel is then moved axially and is inserted into unshirred casing. The shirring process may begin again.

Figures 2, 3:
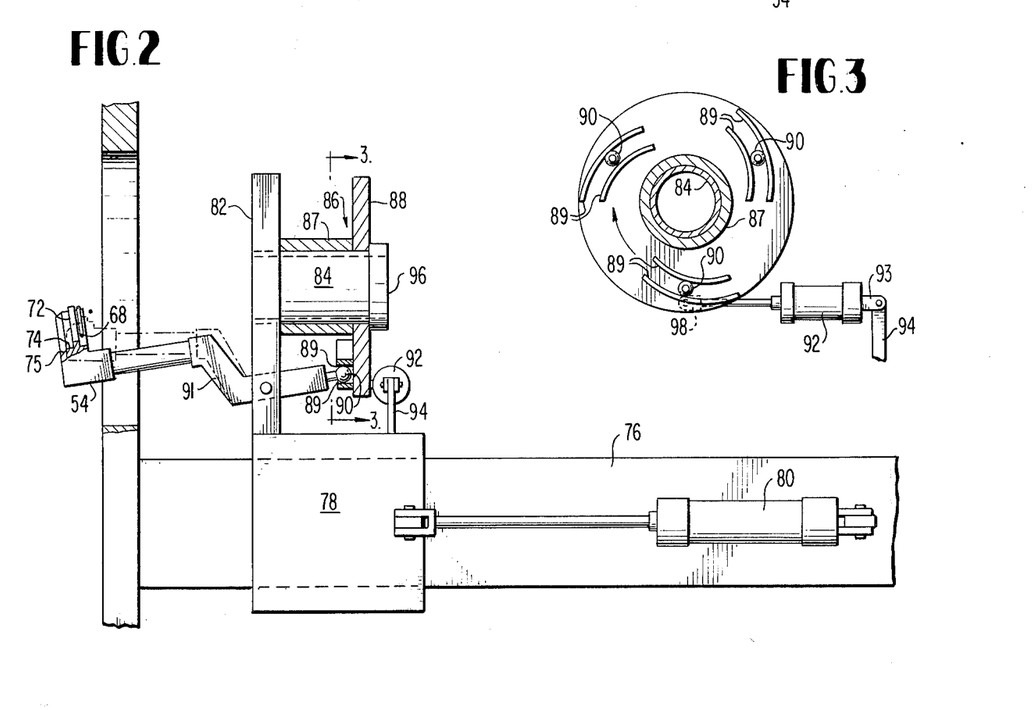
FIG. 2 is a side view of displacing means which are operable to move a pivot arm into a position of engagement with shirred casing and to displace a prescribed length of shirred casing relative to remaining unshirred casing.
FIG. 3 is a transverse sectional view taken along the lines 3—3 of FIG. 2 showing the relation between the end of each pivot arm and a rotating cam.

FIG. 2 illustrates a side view of a schematic form of the invention including a displacing means for effecting the displacement of the shirred casing relative to the unshirred casing. Preferably, the displacing means is defined in part by an arm 91 and an associated rotatable cam 86. As will be hereinafter more fully described, the arm 91 is pivoted by the cam 86 in a radial plane containing the axis of the mandrel 38 (see FIG. 1) to displace a head 54 to a position of contact with the casing but not with the mandrel. The displacing means is further defined in the present embodiment by a carriage 78, a cylinder and piston 80, a base 82, and a head 54 which in conjunction with the arm 91, act essentially as a unit. As will be hereinafter more fully described, the displacing means, acting essentially as a unit, displaces the shirred casing 30 relative to the unshirred casing 28 to sever the casing.

As shown, a horizontal ways 76 provides a smooth surface upon which the carriage 78 for supporting the invention may freely slide generally parallel to the axis of the mandrel 38 (see FIG. 1) in response to the action of a translating means in the form of a pneumatic or hydraulic cylinder and piston 80. A supportive base 82 extends vertically from the carriage 78 and carries a hollow cylinder 84 through which the mandrel 38 and the surrounding unshirred casing 30 pass. In the interest of simplicity, the mandrel 38 and the unshirred casing 28 illustrated in FIG. 1 have not been shown in FIG. 2.

The rotating cam 86 has a cylindrical sleeve 87 and a transverse cam plate 88 which surround the hollow cylinder 84. The cam is held in place by a bearing cap 96. The cam 86 engages, by means of a cam race 89, an end 90 of a pivot arm 91. This arm 91 carries a head 54 at the extreme opposite the end 90. It will be understood, of course, that the invention is preferably comprised of two additional supportive arms 91 which are also pivoted by the rotating cam in a manner identical to that just described. The remaining two arms also carry identical heads 54. These remaining two arms have been omitted for simplicity but an end view of the heads associated with the arms can be seen by referring to FIG. 4.

In operation, the rotating cam is rotated by a second pneumatic or hydraulic cylinder and piston 92, pivotally secured at 93 to the carriage 78 by a rigid extension 94. Rotation of the cam displaces radially the ends 90 of the arms 91 and thus simultaneously pivots the arms in radial planes containing the axis of the mandrel 38. The pivoting of the arms displaces the heads 54 in an essentially radial manner so that each head contacts and breaks contact with the casing in the area of the interface 29.

As mentioned above, after a desired length of casing has been shirred, the motor 46 driving the shirring mechanism stops. After the mandrel has retreated a short distance, the engaging means next engage the shirred 30 and unshirred casing 28 to secure these portions of the casing. The first engaging means, viz., clamping and abutting surfaces 74 and 72 respectively of the heads 54, engage the shirred casing 30 while the second engaging means, viz., the feeding rollers 36, restrain the unshirred casing 28. It will be noted that the clamping surface 74 and the abutting surface 72 together also form a part of the displacing means described earlier.

Thus it may be seen that severing of the casing occurs as the result of cooperation among several items of apparatus. In the preferred embodiment illustrated in FIGS. 1 and 2, the preferred separating means is defined as the feeding rollers 36 which restrain the unshirred casing 28, and the arcuate clamping and abutting surfaces 74 and 72 which engage the shirred casing, and the cylinder and piston assembly 80 which is connected with the clamping and abutting surfaces through the head 54, arm 91, supportive base 82, and carriage 78. The cylinder and piston 80 assembly displaces the clamping and abutting surfaces 74 and 72 respectively and therefore the shirred portion 30 of the casing relative to the feeding rollers 36 and therefore the unshirred portion of casing 28 to sever the casing.

It will be appreciated that in order to accomplish the separation described in the preceding, the two portions of casing must both be secured. The clamping and abutting surfaces of the head 54 secure a shoulder of the shirred casing 30, and the feeding rollers 36 which, when momentarily stopped, firmly grip the unshirred casing to restrain this portion of the casing relative to the displacement of the shirred casing 30.

The portion of the separating means exclusive of the feeding rollers 36 which effects the displacement of the shirred casing 30 and thus the separation of the shirred 30 and the unshirred 28 portions of the casing is comprised of the cylinder and piston assembly 80 and the clamping and abutting surfaces, 74 and 72 respectively as structurally connected thereto by the head 54, arm 91, the supportive base plate 82, and the carriage 78 and as positioned in relation to the casing by the rotating cam 86. This assembly may be referred to as a displacing means.

Although the displacing means may effect the displacement of the shirred casing 30 relative to the unshirred casing 28 in a number of ways, in the preferred embodiment, the displacing means directly contacts the shirred casing 30 by means of the clamping and abutting surfaces of the head 54. Concurrently, a penetrating means 68, shown in FIG. 2 and hereinafter more fully described, contacts the interface 29 (see FIG. 5). To accomplish this contact, a portion of the displacing means comprised of the rotating cam 86 and the pivot arm 91, function to displace the head 54 to a position of contact with a shoulder of the shirred casing 30. It should be noted at this point that though in the preferred embodiment the first engaging means, the displacing means, and the penetrating means are rigidly connected by the head 54, as suggested earlier, each of these three elements could function independently.

It can be seen from FIGS. 1 and 2 that the head 54, is disposed on the pivot arm 91 at the extreme opposite the end 90 engaged by the rotating cam 86. In operation, the rotating cam 86 rotates in response to the second cylinder 92 after the retreating mandrel 38 has drawn a short length of unshirred casing 28 from between the shirring rollers and thus exposed and the interface 29 between the shirred 30 and the unshirred 28 portions. Proper rotation of the cam 86 forces the ends 90 of the pivot arms 91 radially outward relative to the hollow cylinder 84 and thus, by pivoting the arms 91 in radial planes, displaces each head 54 radially toward the interface 29 between the shirred 30 and the unshirred 28 casing. The heads 54 ultimately engage a shoulder of the shirred casing through the clamping and abutting surfaces 74 and 72.

It can be seen that the head 54 functions as a connecting means and unifies the first engaging means 72 and 74, the displacing means (the head 54, surfaces 72 and 74, arm 91, base 82, cam 86, carriage 78, and cylinder and piston assembly 80, and the penetrating means 68. Once the head 54 contacts the casing as described in the preceding paragraph, the penetrating means 68 surrounds substantially the full circumference of the casing at essentially the interface 29 and at least partially penetrates this substantially full circumference. This completes the first phase of a composite motion employed to sever the casing.

In the second phase of the composite motion, the head 54 remaining in an engaged position, the cylinder and piston 80 translates the carriage 78 and thereby the head 54 and the shirred casing 30 relative to the unshirred casing to separate the shirred casing 30 from the unshirred casing 28. The shirred casing can move relative to the unshirred casing by virtue of the axial freedom developed incident to the continuous retreat of the mandrel after the shirring mechanism stops. During this phase the unshirred casing 28 is restrained by the second engaging means, viz., the feed rolls 36. Once the shirred casing 30 is separated from the unshirred casing 28, the severing is complete. The rotating cam 86 is returned to the previous position by the cylinder and piston 92 and thus displaces the end 90 of the arm 91 radially inward toward the hollow cylinder 84. This radially inward displacement pivots the end 90 of the arm 91 radially toward the hollow cylinder 84 and moves the clamping and abutting surfaces 74 and 72 of each head out of contact with the casing. Once the head 54 has moved out of contact with the casing, the cylinder and piston 80 retracts the carriage 78 to its previous position. Once the loaded mandrel is fully withdrawn and rotated out of position, a second mandrel may be fully inserted between the shirring rollers 26, and the shirring process may begin again.

FIG. 3 is a transverse sectional view taken along lines 3—3 of FIG. 2 and shows more fully the relation between the ends 90 of the pivot arms 91 and the rotating cam 86. As illustrated, the rotating cam is characterized by a cylindrical sleeve 87 which surrounds the hollow cylinder 84, and a transverse cam plate 88 which carries a cam race 89 for each of the pivot arms 91. Within each cam race is disposed an end 90 of one of the pivot arms 91 which, as mentioned, are circumferentially arranged about the mandrel 38 and associated casing. The cam 86 is freely rotatable on the hollow cylinder 84 by a second cylinder and piston 92 which is pivotally secured to the carriage 78 by a rigid extension 94 of the carriage 78. The cylinder 92 is secured to the transverse cam plate 88 by a pin and yoke arrangement as indicated generally at 98. Because the pivot arms 91 are pivotally disposed on the supportive base 82, rotation of the cam 86 by the second cylinder and piston 92 forces the ends 90 to move radially relative to the hollow cylinder 84. When the ends 90 are radially more proximal to the hollow cylinder 84, the arms 91 are oriented so that the surfaces 72 and 74 of the heads 54 are out of contact with the casing. However, when the ends 90 are less proximal to the hollow cylinder 84, the arms 91 are oriented so that the surfaces 72 and 74 of the heads 54 may be in contact with the casing.

It will be appreciated that a number of methods could be employed to move the heads 54 radially in and out of contact with the casing. For instance, rather than a cylindrical rotating cam as shown in FIGS. 2 and 3, a sliding cam might be provided. Such a cam would move in a direction parallel to the axis of the mandrel 38 and casing. The sliding cam might be characterized by radially splayed camming surfaces which would embrace rollers disposed on each of the ends 90 of the pivot arms 91. If the camming surfaces were splayed radially outward, axial movement of the sliding cam away from the shirred portion of the casing would displace the ends 90 radially outward and would pivot the pivot arms 91 to move the heads 54 radially inward into contact with the casing. Movement in the direction of the unshirred casing would displace the ends 90 radially inward and would pivot arms 91 to move the heads 54 radially outward out of contact with the casing. The sliding of the cam might be effected by means of a cylinder and piston arrangement similar to that located at 92 in FIGS. 2 and 3. The operation of the apparatus for severing the casing would, in all other respects, be identical to that described earlier.

It will be appreciated at this point that the invention as described in the foregoing is relatively simple in structure. Structurally the invention entails only a few parts which may interact at relatively high speeds and without the complexity of prior art devices. The apparatus of the present invention may thus provide relatively dependable service and be essentially maintenance free.

Figure 4:
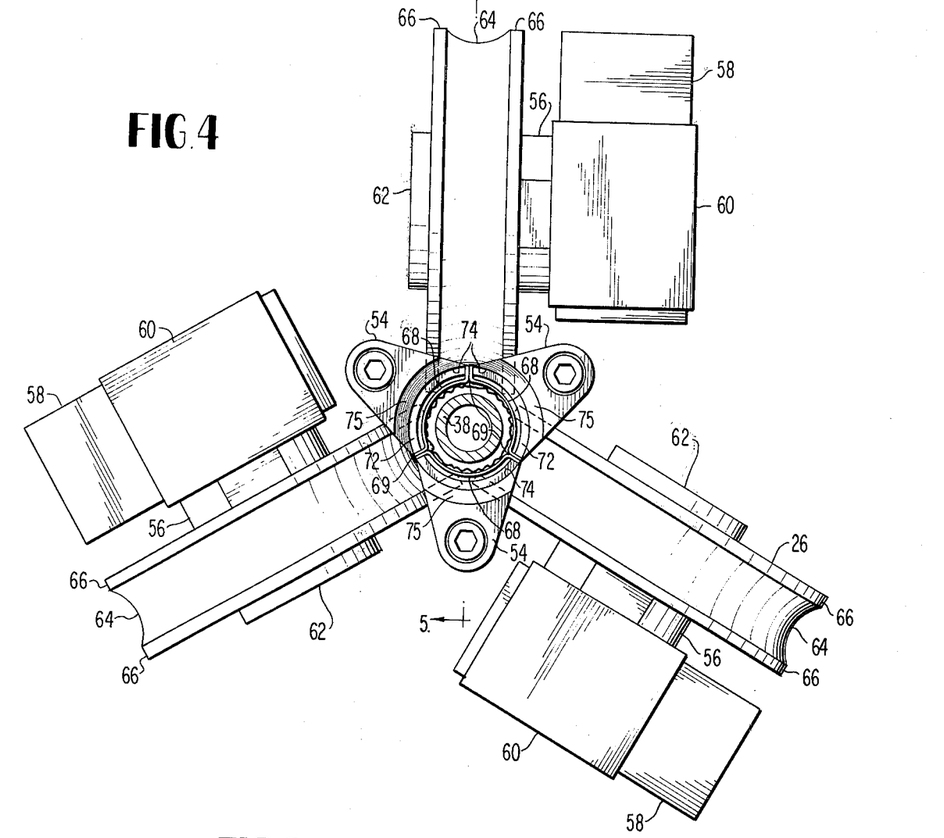
FIG. 4 is a sectional view taken along the lines 4—4 of FIG. 1 showing the apparatus of the invention in full contact with the casing and showing the position of the shirring rollers relative to the casing and the apparatus for severing the casing.

FIG. 4 illustrates a vertical sectional view taken along line 2—2 of FIG. 1 and shows the angular and spacial relationship between the shirring rollers 26 and the heads 54. The heads 54 carry the arcuate clamping surfaces 74, the abutment surfaces 72, and the penetrating means 68 which facilitate the clamping, abutting, and at least partial penetrating of the casing.

As illustrated in FIG. 4, the shirring rollers 26 are disposed about the mandrel 38 and ordinarily surround the casing in a generally circumferential manner at equal 120° intervals. The shirring rollers 26 and thus the arcuate central surfaces 64 which are bounded by short cylindrical surfaces 66 are located in sufficient proximity to the mandrel 38 that the arcuate central surfaces 64 may frictionally grip the casing. The gripping is facilitated by the resistance of the internal pressure of inflation to the extent that the stirring rollers may fold the unshirred casing in tight overlays or shirrs 52 against the slowly retreating backup block 48 as mentioned in connection with FIG. 1.

The balanced, circumferential disposition of the heads 54 and the manner in which the heads equally engage the casing without contacting the mandrel 38 is quite significant. It can be seen from FIG. 4 that the heads 54 engage the casing in a manner in which the applied forces are balanced so as to substantially avoid the exertion of any moment in the long, slender mandrel 38. It can also be seen that the heads 54 remain out of contact with the mandrel 38 during engagement of the casing. Thus, by the balancing of the forces of contact exerted against the casing above and the elimination of any direct contact with the mandrel, the invention may avoid any overstressing, fatigue, fracture, or surface wear of the mandrel.

As shown in FIG. 4, the shirring rollers 26 are rotationally disposed on and supported by supportive housings 56 which depend from differential housings 60 which in turn depend from extensions 58 of bases 61. The shirring rollers 26 are in each case retained on the supportive housings 56 by retaining caps 62 which restrain the shirring rollers 26 from axial movement and thus maintain the rollers in proper relation to the mandrel 38 and the surrounding casing.

The heads 54 and thus the clamping 74 and abutting 72 surfaces and the penetrating means 68 are shown in FIG. 4 in a position in which the arcuate penetrating means 68 is in circumferential contact with essentially the full circumference of the casing at a location at which it is desired to sever the shirred from the unshirred casings. This location is generally at the interface 29 between the shirred 30 and the unshirred casing (see FIG. 5). It should be noted that it is not necessary that the casing be penetrated and ultimately severed at the interface. However, this may be desirable in avoiding unwanted lengths of unshirred material at the end of the casing stick. By circumferentially contacting essentially the full circumference, undesirable loose flags, strands, or tatters which may result from insufficiently uniform circumferential penetration may be avoided.

A preferred penetrating means is comprised of the arcuate lengths of wire illustrated in FIG. 4. These wires may be heated by resistance to electrical current flowing therethrough when the heads 54 and thus the wires 68 are out of contact with the casing. As the heads 54 are moved to contact with the casing, the flow of current may be interrupted in order to avoid short circuiting at the point of contact 69 of the wires. However, though the flow of current is interrupted, the arcuate lengths of wire retain sufficient heat to at least partially decompose or penetrate essentially the full circumference of the casing.

The heads 54 move to the position shown in FIG. 4 when, after a desired length of casing has been shirred, the retreating mandrel draws a short length of unshirred casing from between the shirring rollers 26 to expose the casing to the heads. When the unshirred portion of casing has been exposed, the heads 54 and the associated clamping surfaces 74 and the abutting surfaces 72, move into contact with the casing to circumferentially contact substantially the full circumference thereof. Each clamping surface 74 and the abutting surface 72 engage a shoulder portion 102 (see FIG. 5) of the shirred casing immediately adjacent the unshirred portion so that the adjacent penetrating means 68 may contact and at least partially penetrate the unshirred casing. The penetration in this preferred embodiment occurs essentially at the interface 29 of the shirred 30 and the unshirred 28 portions.

The penetration mentioned in the preceding paragraph occurs by means of the hot, arcuate wires 68 which decompose the thin casing at essentially the locus of the points of contact about the casing and thus at least partially penetrate substantially the full circumference of the casing essentially at the interface 29. It should be emphasized that the hot wires need not fully decompose and penetrate the full circumference of the casing in an absolute sense. The hot wires need only at least partially decompose and thus only partially penetrate substantially the full circumference, the subsequent displacement of the shirred casing relative to the unshirred casing may serve to overstress and thus completely sever the casing.

Figures 5, 8:
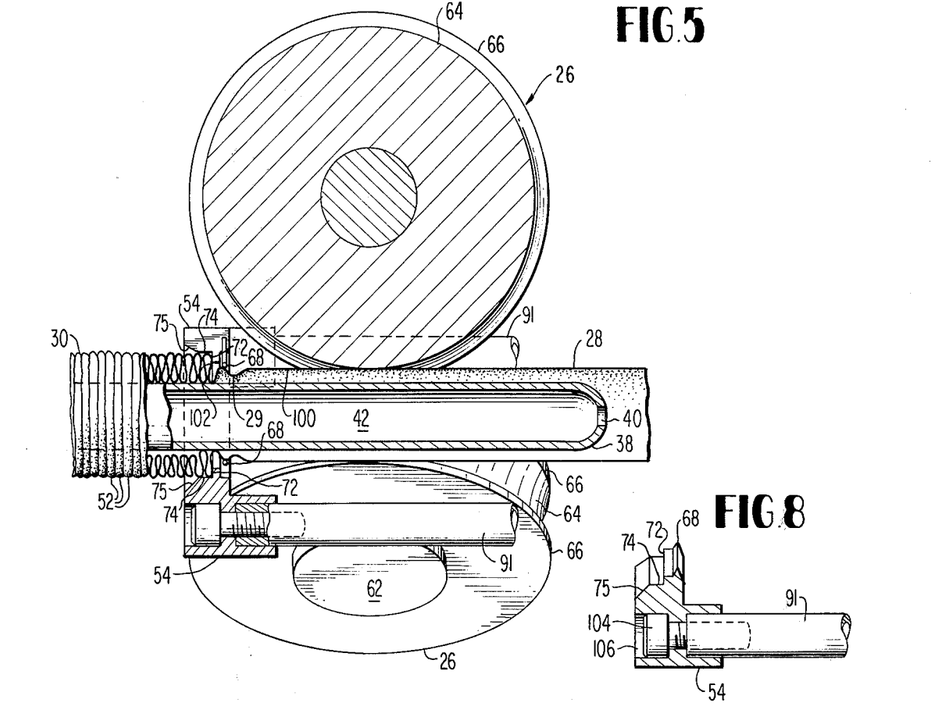
FIG. 5 is a vertical sectional view taken along the lines 5—5 of FIG. 4 showing the relation of the first engaging means and the penetrating means to the shirred and unshirred portions of the casing during full contact with the casing.
FIG. 8 is a vertical sectional view taken along the lines 8—8 of FIG. 7 showing the head of an alternative embodiment of the invention.

FIG. 5 shows a vertical sectional view taken along the lines 5—5 of FIG. 4 and illustrates the relationship of the clamping and abutting surfaces and the penetrating means to the shirred and unshirred portions of the casing during full contact with the casing. It should be noted that the mandrel 38 remains inserted only a short distance between the shirring rollers 26. This will be generally the most desirable posture for the mandrel during the cutting operation. The shirring rollers 26 have stopped and the mandrel 38 has continued to withdraw a short distance from between the rollers 26 to expose the short length of unshirred casing indicated generally at 100. As described in connection with FIG. 2, the abutting surfaces 72 and clamping surfaces 74 have been moved into contact with the casing in the first phase of the composite motion by which the casing is severed. These surfaces engage the shirred portion 30 of the casing at the shoulder 102 of the shirred casing 30 at a location generally adjacent the interface 29 between the shirred 30 and the unshirred 28 casings.

By virtue of the fact that the penetrating means 68, such as the heated arcuate lengths of wire described earlier, are located immediately adjacent the abutting surfaces 72, the penetrating means 68 contact substantially the full circumference of the casing essentially at the interface 29 of the shirred and the unshirred portions. Thus, the casing is severed at the section at which the penetrating means 68 contact the casing, and substantially no unshirred casing will remain a part of the shirred casing 30 after the severing operation is completed. The inflating pressure of the pressurized medium entering the casing through the interior 42 of the mandrel 38 by way of the orifice means 40 maintains the casing 28 in an inflated but otherwise unsupported condition so that the casing at the interface 29 may be pressed with considerable force by a fluid cushion against the penetrating means 68. In this regard it should be noted that the inflated diameter of the unshirred casing is somewhat larger in diameter than the inside diameter of the circular enclosure formed by the penetrating means of the closed, cooperating heads. Thus, the unshirred, inflated casing may be constrained and thereby subjected to radial cutting forces by the effects of the penetrating means as the heads close about the casing. At no time does the penetrating means contact the mandrel.

Figure 7:
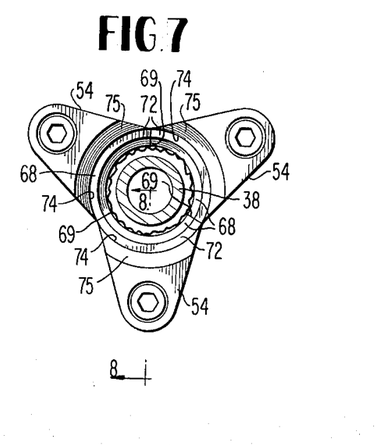
FIG. 7 is an end view of the heads of an alternative embodiment shown in a position of full contact with the casing.

Once the heads have been moved into the position shown in FIG. 7 in which the casing is symmetrically clamped and abutted, and at least partially penetrated about essentially the full circumference thereof, the second phase of the composite motion displaces the carriage 78 parallel to the longitudinal axis of the casing in a direction toward the shirred casing. The heads 54, being attached through the pivot arms 91 to the carriage 78 therefore simultaneously move with the carriage parallel to the axis of the casing. The shirred portion 30 of the casing is thus displaced relative to and thereby separated from unshirred casing 28 which is restrained by the feed rollers 36. It will be appreciated from the previous discussion that the movement of the shirred casing is not resisted by the axial relaxation or expansion of the already shirred casing.

Thus, if full penetration of the full circumference of the casing has not been accomplished, the essentially uniform tensile stress exerted by the evenly placed and simultaneously acting heads locally overstresses areas of incomplete penetration and thereby cleanly breaks and separates the shirred casing from the unshirred casing at the interface 29 where the partial penetration has occurred. The essentially uniform axial stress and the partial penetration of essentially the full circumference of the casing ensures that the severed section will be free of loose flags, strands, or tatters.

Of independent significance, the severing just described is accomplished by a composite motion wherein there is essentially no contact of the mandrel by the severing mechanism. As a result, mandrel operation and life may be significantly improved.

The point at which the casing is severed is not dependent upon the point at which any catch finger or similar device engages the shirred casing preparatory to unshirring of the previously shirred casing. Thus, unnecessary puncturing may be avoided. Furthermore, because essentially the full circumference of the casing is at least partially penetrated at the interface 29, substantially less force may be required to separate the shirred from the unshirred casing. Thus, the introduction of residual stresses or distortions to the portion of the casing adjacent the severed section may be avoided.

It will be appreciated that the severing of shirred from unshirred casings as described in the preceding may avoid loose flags, strands, or tatters due to the composite motion in which essentially the full circumference of the casing is at least partially penetrated prior to separation of the shirred from the unshirred casing.

Unnecessary puncturing may be avoided since aside from the partial penetration by the penetrating means of essentially the full circumference of the casing, all other surfaces contacting the casing simply clamp or abut the casing. It bears repeating at this point that the mandrel is never directly contacted by an element of the invention. Finally, because the casing is at least partially penetrated about the full circumference thereof in the first phase of the composite motion, less force may be required to separate the shirred from the unshirred portions. Because of the relatively low forces required to separate the length of shirred casing, the likelihood that residual stresses or distortions may be introduced into the casing may be substantially reduced.

Figure 6:
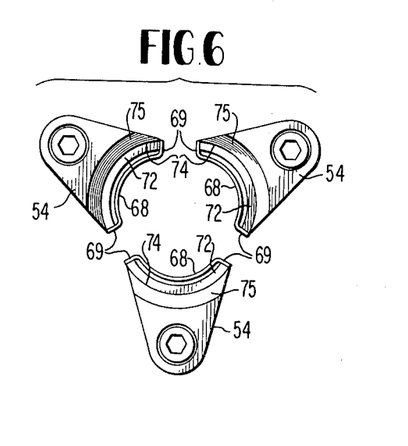
FIG. 6 is an end view of an embodiment of the invention showing the heads of the apparatus in a position out of contact with the casing.

FIG. 6 shows an end view of an embodiment of the invention and illustrates a withdrawn or open position of the heads wherein there would be no contact with any casing. The heads 54 may be seen to be arranged in equal angular intervals of 120° so that the heads are circumferentially disposed about the mandrel and casing. The mandrel and casing in this figure for simplicity have been eliminated. However, these features can be seen in relation to closed heads by reference to FIG. 4. Disposed on the heads are penetrating means 68 in the form of arcuate lengths of wire. When in the position shown, electrical circuits, of which each length of wire forms a part, are completed and the wires are heated by resistance to the flow of current therethrough. The circuits remain closed until the heads 54 move radially into contact with the casing whereupon the circuits are broken to avoid shorting. However, it should be appreciated that though the circuits are broken the wires retain sufficient heat to allow at least partial decomposition or penetration of the casing by the wires.

Immediately adjacent the wires, as best illustrated and more fully described in connection with FIG. 5, there are aubtting surfaces 72 and associated arcuate clamping surfaces 74. As more fully explained in connection with FIG. 5, these surfaces symmetrically abut and clamp a shoulder of the shirred casing while the penetrating means concurrently at least partially penetrates substantially the full circumference of the casing. This engagement and penetration takes place only when the heads 54 move from the open position illustrated in FIG. 6, to what may be termed a closed position as illustrated in FIG. 4, whereupon the penetrating means contact one another at points of contact indicated generally at 69.

FIG. 7 shows an end view of the heads of an alternative embodiment illustrating the heads in a position of essentially full contact with the casing. The heads 54 are shown disposed at equal 120° intervals. In this way, the heads are circumferentially disposed about the casing and engage substantially the full circumference thereof and exert only balanced forces when brought into the position of full contact with the casing illustrated in FIG. 6. It should be emphasized that while in this preferred form the surfaces 72 and 74 fully surround and circumferentially engage the shirred casing, there need not be full circumferential contact. All that is required is that the surfaces engage the shirred casing in a manner which allows the casing to be subjected to essentially uniform axial stress upon movement of the carriage. It should further be recognized that at no time do the heads 54 contact in any way the mandrel 38.

Penetrating means 68 are shown disposed on the head in FIG. 7 in the form of arcuate blades. The blades at least partially penetrate essentially the full circumference of the casing when moved radially against the interface 29 of the casing against the resistance afforded the otherwise unsupported unshirred casing by the pressurized inflating medium within the interior thereof. It will be recalled from the discussion of FIG. 5 that the resistance of the inflated casing develops radial cutting forces by virtue of the radial constraint of the inflated casing by the surrounding penetrating means. The tendency of the penetrating means to penetrate at least partially the full circumference of the casing is enhanced by the axial movement of the heads wherein the casing may be tensioned and thus pressed even more firmly in a radial direction against the penetrating means 68. It will be understood, in this regard that the diameter of the circle formed by the penetrating means when the heads are in a closed position is smaller than the inflated diameter of the unshirred casing at the interface of the shirred and the unshirred portions. Therefore, the tensile forces exerted in the casing tend to restore the casing to its normal diameter against the constraining forces exerted by the penetrating means. Therefore, the resultant of the tensile forces in the casing will be understood to be a force directed against the penetrating means by the tensioned casing.

As in FIG. 6 the penetrating means are carried by the heads 54 immediately adjacent the abutting surfaces 72 and associated clamping surfaces 74. It will be noted that the heads, including the penetrating means and the abutting and clamping surfaces are so configured that in the position of substantially full contact shown in FIG. 7 the heads may tightly contact one another at the points of contact 68. This facilitates the effective symmetrical abutting and clamping of the shirred casing and the penetration of essentially the full circumference of the casing at the interface 29.

FIG. 8 is a vertical sectional view taken along the lines 8-8 of FIG. 7 and illustrates the head 54 of an alternative embodiment described in the preceding. As shown, each head 54 is secured to a pivotable arm 91 in any suitable fashion. A threaded fastener 104, countersunk in the head 54 as illustrated generally at 106, is one of several possible methods of securinig the head to the arm. As mentioned above, the penetrating means 68 takes the form of a rigid, arcuate blade which at least partially penetrates the casing at the interface 29. The chamfer 75 ensures proper clearance between the remaining portions of the head and the shirred casing. As in the case of the preferred embodiment discussed in connection with FIG. 6, the alternative embodiment just described at no time directly contacts the mandrel 38. The cutting and at least partial penetration of the casing by the blade weakens the casing and permits a clean cut when the weakened area is overstressed by the displacement of the shirred casing relative to the unshirred casing.

The operation of the invention and an associated typical shirring machine briefly summarized involves first the full insertion of a mandrel, cantilevered from a horizontally rotatable turret, between the shirring rollers of the machine and within the unshirred casing to be shirred. As the shirring rollers shirr the casing against the backup block attached to the mandrel, the mandrel retreats in the direction of the accumulating shirred casing. Once a desired length of casing has been shirred, the shirring mechanism stops. The mandrel and backup block, however, continue to retreat and concurrently a short length of unshirred casing is advanced past the shirring rollers. The shirred casing may, however, "expand" axially during this movement.

Next, the heads are pivoted radially into contact with the casing. The shoulder defined by the last few folds of the shirred portion of the casing is engaged by the clamping and abutting surfaces and substantially the full circumference of the unshirred is contacted and at least partially penetrated by the penetrating means. The feeding rollers stop and secure the unshirred portion of the casing relative to the shirred casing. When both the shirred and the unshirred casing are engaged and the casing at least partially penetrated, the shirred casing is displaced relative to the unshirred casing to separate these two opposed portions. The shirred casing is displaced by the movement of the heads parallel to the axis of the mandrel while the unshirred casing is restrained by the feeding rollers, and the casing is thus separated at the section previously at least partially penetrated.

The mandrel continues to retreat after the casing is severed. Ultimately the mandrel reaches a fully retracted position whereupon the turret rotates and a second mandrel is moved into the previous position of the first mandrel. This second mandrel is next fully inserted between the shirring rollers and within the unshirred casing and the entire operation can be repeated.

SUMMARY OF THE ADVANTAGES

It will be appreciated that in providing an apparatus for severing casing according to the present invention certain significant advantages are obtained.

In particular, the unique composite motion of the apparatus of the present invention wherein essentially the full circumference of the casing is at least partially penetrated prior to displacement of the shirred casing relative to the unshirred casing provides the advantage of a very clean cut free from any loose flags, strands, or tatters with a minimum of unshirred casing remaining connected to the shirred casing.

A further significant advantage resides in the fact that by at least partially penetrating essentially the full circumference of the casing, subsequent separation by displacement of the shirred casing relative to the unshirred casing introduces little stress into the casing and thus essentially no residual stresses or distortions are developed in the ends of the casing adjacent the section at which the casings are separated.

By reason of the circumferential contacting of the casing and the clearance maintained between the heads and the mandrel, an apparatus for severing casings is provided which enjoys the advantage that the long slender mandrel over which the casing moves is not subject to stresses of excessively great magnitudes.

Finally, the apparatus for severng casings which is provided is quite simple and entails very few parts which interact in a simple manner. Thus, the apparatus can function at a speed compatible with the relatively high speed at which the casing is shirred with the result that overall production of shirred casing may proceed more rapidly. Furthermore problems of lubrication, contamination of the casing, maintenance and costly manufacture are minimized.

In describing the invention, reference has been made to a preferred embodiment; however, those skilled in the art and familiar with the disclosure of the invention may recognize additions, deletions, substitutions, or other modifications which would fall within the purvue of the invention as defined in the claims.

What is claimed is:

1. An apparatus for severing a length of shirred casing for prepared meats from unshirred casing, said apparatus comprising:
    an apertured cylindrical mandrel means for receiving prepared meat casing therearound, said apertured cylindrical mandrel means having aperture means for introducing a pressurized fluid into a zone between said mandrel means and said casing to inflat said casing to a maximum diameter greater than a diameter of said mandrel means;
    means for introducing unshirred casing around said apertured mandrel means;
    shirring means for folding the inflated, unshirred casing into tight overlays to provide a length of shirred casing;
    a plurality of arcuate penetrating means for contacting and at at least partially penetrating substantially an entire circumference of said inflated casing at a loation defining essentially an interface between said shirred and said unshirred casing, said penetrating means being movable radially inwardly from a first position of no contact with said casing to a second position of balanced, substantially full circumferential contact with said inflated, unshirred casing;

limiting means operably connected to said arcuate penetrating means for limiting said radial movement thereof so that said arcuate penetrating means together form an essentially circular enclosure of said unshirred casing of a diameter;

greater than that of said mandrel, but less than the diameter to which said contacted circumference is being urged by said pressurized fluid, such that said pressurized fluid establishes a fluid cushion against which said penetrating means acts to effect said at least partial penetration of said unshirred casing while said penetrating means and said contacted casing circumference are out of contact with said mandrel; and separating means for separating said length of shirred casing from said unshirred casing, said separating means comprising:

first engaging means for engaging a portion of said length of shirred casing;

second engaging means for engaging a portion of said unshirred casing; and displacing means for displacing said first engaging means to separate said length of shirred casing from said unshirred casing to sever said length of shirred casing from said unshirred casing.

2. The apparatus for severing a length of shirred casing of claim 1 wherein said limiting means comprises:

contact surfaces disposed on and between each of said penetrating means, adjacent contact surfaces on adjacent penetrating means being inclined at equal angles so that said contact surfaces mate to limit said radial movement of said penetrating means.

3. The apparatus for severing a length of shirred casing of claim 2 wherein said arcuate penetrating means comprises:

a plurality of arcuate heating means movable to contact with said circumference of said casing, for at least partially decomposing said circumference of said casing upon contact of said heating means with said casing.

4. The apparatus for severing a length of shirred casing of claim 3 wherein said plurality of arcuate heating means are circumferentially disposed at equal angular intervals when said heating means are in contact with said casing.

5. The apparatus for severing a length of shirred casing of claim 3 wherein said heating means comprises arcuate lengths of wire, said lengths of wire being heatable by resistance to a flow of electricity therethrough prior to contact with said casing, said flow of electricity being interruptable prior to contact of said casing by said heated length of wire.

6. The apparatus for severing a length of shirred casing of claim 2 wherein:

said arcuate penetrating means comprises a plurality of arcuate blade means, movable to contact said circumference of said casing, for at least partially penetrating said casing upon contact of said blade means with said casing.

7. The apparatus for severing a length of shirred casing of claim 6 wherein said plurality of arcuate blade means are circumferentially disposed at equal angular intervals when said blade means are in contact with said casing.

8. The apparatus for severing a length of shirred casing of claim 2 wherein said first engaging means comprise:

a plurality of arcuate clamping surface means for clamping said shirred casing.

9. The apparatus for severing a length of shirred casing of claim 8 wherein said clamping surface means are carried by pivot arm means for selectively moving said clamping surface means into engagement with said shirred casing.

10. The apparatus for severing a length of shirred casing of claim 8 wherein said second engaging means comprise:

feeding means for selectively feeding and restraining said unshirred casing.

11. The apparatus for severing a length of shirred casing of claim 10 wherein said displacing means comprise:

abutment surface means for abutting a shoulder of said shirred casing; and translating means for translating said abutment surface means in a direction parallel to a longitudinal axis of said mandrel means to sever said length of said shirred casing from said unshirred casing engaged by said second engaging means.

12. The apparatus for severing a length of shirred casing of claim 11 wherein said abutment surface means and said first engagement means are rigidly connected.

13. The apparatus for severing a length of shirred casing of claim 11 wherein said translating means comprises:

piston means operatively connected to said abutment surface means for translating said abutment surface.

14. An apparatus for severing a length of shirred casing for prepared meat from unshirred casing, said apparatus comprising:

a mandrel for receiving said casing;

penetrating means for at least partially penetrating substantially an entire circumference of said casing to weaken said circumference said penetrating means being movable from a condition out of contact with said casing radially inwardly to a condition spaced apart from said mandrel but in contact with said unshirred casing circumferentially constraining the unshirred casing to a diameter less than that of the shirred casing;

first engaging means disposed to one side of said penetrating means for engaging said shirred casing;

second engaging means disposed to the other side of said penetrating means for engaging said unshirred casing; and displacing means cooperating with said penetrating means for displacing said first engaging means relative to said second engaging means so as to exert longitudinal tensioning forces on the unshirred casing to:

maintain said unshirred casing substantially out of contact with said mandrel, force said unshirred casing against said penetrating means while said unshirred casing remains in substantially continuously spaced apart relation to said mandrel, and overstress said weakened circumference of said casing between said shirred and unshirred casing to thereby sever said length of shirred casing from said unshirred casing.

15. The severing apparatus of claim 14 wherein said penetrating means comprise:
a plurality of arcuate heating means, movable to contact said circumference of said casing, for at least partially decomposing said circumference of said casing upon contact of said heating means with said casing.

16. The severing apparatus of claim 15 wherein said plurality of arcuate heating means are circumferentially disposed at equal angular intervals when said heating means are in contact with said casing.

17. The severing apparatus of claim 15 wherein said heating means comprise:
lengths of wire, said lengths of wire being heatable by resistance to a flow of electricity therethrough prior to contact with said casing, said flow of electricity being interruptable prior to contact of said casing by said heated lengths of wire.

18. The severing apparatus of claim 14 wherein said penetrating means comprise:
a plurality of arcuate blade means, movable to contact said circumference of said casing, for at least partially penetrating said casing upon contact of said blade means with said casing.

19. The severing apparatus of claim 18 wherein:
said plurality of arcuate blade means are circumferentially disposed at equal angular intervals when said blade means are in contact with said casing.

20. The severing apparatus of claim 14 wherein said first engaging means comprise:
a plurality of arcuate clamping surface means for clamping said shirred casing.

21. The severing apparatus of claim 20 wherein said clamping surface means are carried by pivot arm means for selectively moving said clamping surface means into engagement with said shirred casing.

22. The severing apparatus of claim 20 wherein said second engaging means comprise:
feeding means for selectively feeding and restraining said unshirred casing.

23. The severing apparatus of claim 14 wherein said displacing means comprise:
abutment surface means for abutting a shoulder of said shirred casing occurring at an interface between said shirred and said unshirred casing; and
translating means for translating said abutment surface means in a direction parallel to a longitudinal axis of said mandrel means to sever said length of said shirred casing from said unshirred casing engaged by said second engaging means.

24. The severing apparatus of claim 23 wherein said abutment surface means and said first engagement means are rigidly connected.

25. The severing apparatus of claim 23 wherein said translating means comprise:
piston means operatively connected to said abutment surface means for translating said abutment surface.

26. An apparatus for severing a length of shirred casing for prepared meat from unshirred casing, said apparatus comprising:
mandrel means for receiving the shirred casing therearound;
inflation means for introducing a pressurized fluid into an interior of said casing disposed around said mandrel means to inflate and maintain a portion of said casing out of contact with said mandrel means;
penetrating means for at least partially penetrating a portion of said casing inflated by said inflation means to weaken said casing, said penetrating means being movable from a condition out of contact with said casing radially inwardly to a condition spaced apart from said mandrel but in contact with said unshirred casing;
limiting means operably connected to said arcuate penetrating means for limiting said radial movement thereof so that said arcuate penetrating means together form an essentially circular enclosure for said unshirred casing of a diameter;
greater than that of said mandrel, but
less than the diameter to which said contacted circumference is being urged by said pressurized fluid so as to maintain said penetrating means in spaced apart relation to said mandrel and in constricting relation to said unshirred casing;
first engaging means for engaging a portion of said shirred casing;
second engaging means for engaging a portion of said unshirred casing; and
displacing means cooperating with said penetrating means for displacing said first engaging means relative to said second engaging means to exert longitudinal tensioning forces on said unshirred casing to:
maintain said unshirred casing substantially out of contact with said mandrel,
force said unshirred casing against said penetrating means while said unshirred casing remains in substantially continuously spaced apart relation to said mandrel, and
overstress said weakened portion of said casing to sever a length of shirred casing from said unshirred casing.

27. The apparatus for severing a length of shirred casing of claim 26 wherein said limiting means comprises:
contact surfaces disposed on and between each of said penetrating means, adjacent contact surfaces on adjacent penetrating means being inclined at equal angles so that said contact surfaces mate to limit said radial movement of said penetrating means.

28. The severing apparatus of claim 27 wherein said penetrating means comprise:
a plurality of arcuate heating means, movable to contact said circumference of said casing, for at least partially decomposing a circumference of said casing upon contact of said heating means with said casing.

29. The severing apparatus of claim 28 wherein said plurality of arcuate heating means are circumferentially disposed at equal angular intervals when said heating means are in contact with said casing.

30. The severing apparatus of claim 29 wherein said heating means comprise:
lengths of wire, said lengths of wire being heatable by resistance to a flow of electricity therethrough prior to contact with said casing, said flow of electricity being interruptable prior to contact of said casing by said heated length of wire.

31. The severing apparatus of claim 27 wherein said penetrating means comprise:
a plurality of arcuate blade means, movable to contact a circumference of said casing, for at least partially penetrating said casing upon contact of said blade means with said casing.

32. The severing apparatus of claim 31 wherein said plurality of arcuate blade means are circumferentially disposed at equal angular intervals when said blade means are in contact with said casing.

* * * * *